Figure 1:
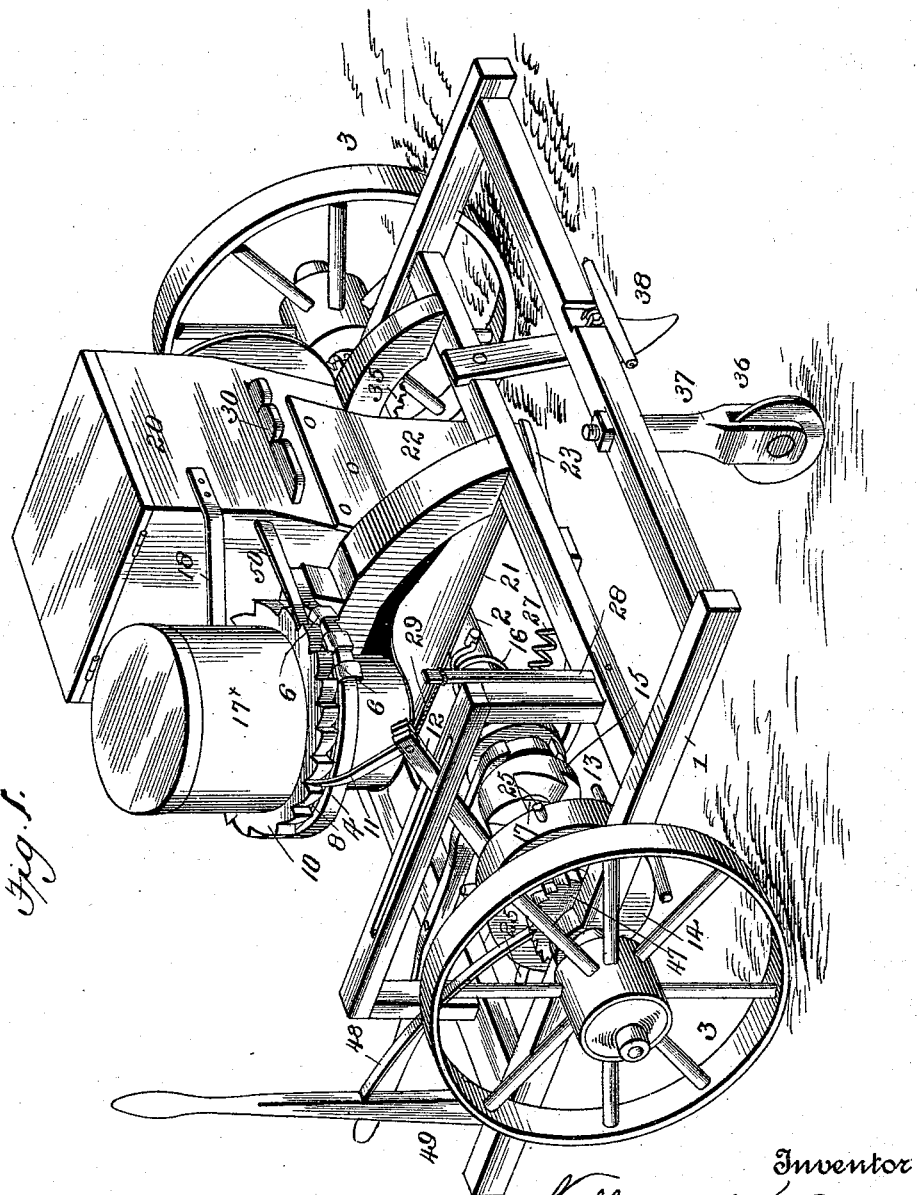

(No Model.) 3 Sheets—Sheet 1.

W. F. BIRD.
COMBINED CORN PLANTER AND FERTILIZER DISTRIBUTER.

No. 543,459. Patented July 30, 1895.

Witnesses
Inventor
William F. Bird
By H. Devillson
Attorney (No Model.) 3 Sheets—Sheet 2.

W. F. BIRD.
COMBINED CORN PLANTER AND FERTILIZER DISTRIBUTER.

No. 543,459. Patented July 30, 1895.

Witnesses
Maude Clarkson

Inventor
William F. Bird
by H. B. Willson
Attorney (No Model.) 3 Sheets—Sheet 3.

W. F. BIRD.
COMBINED CORN PLANTER AND FERTILIZER DISTRIBUTER.

No. 543,459. Patented July 30, 1895.

Witnesses Inventor
William F. Bird
By
Attorney

UNITED STATES PATENT OFFICE.

WILLIAM FRANKLIN BIRD, OF BRUCETON MILLS, WEST VIRGINIA.

COMBINED CORN-PLANTER AND FERTILIZER-DISTRIBUTER.

SPECIFICATION forming part of Letters Patent No. 543,459, dated July 30, 1895.

Application filed October 6, 1894. Serial No. 525,134. (No model.)

*To all whom it may concern:*

Be it known that I, WILLIAM FRANKLIN BIRD, a citizen of the United States, residing at Bruceton Mills, in the county of Preston and State of West Virginia, have invented certain new and useful Improvements in a Combined Corn-Planter and Fertilizer Distributer; and I do declare the following to be a full, clear, and exact description of the invention, such as will enable others skilled in the art to which it appertains to make and use the same.

My invention has relation to corn-planters having fertilizer-distributing attachments connected therewith; and among the objects in view is to provide a corn-planter of the class referred to which shall be comparatively simple in its construction and efficient in operation and which is adapted to vary the quantity of corn and fertilizer dropped into the furrow.

With the above and other objects in view the invention consists in the novel construction, arrangement, and combination of parts, as hereinafter fully described, illustrated in the drawings, and pointed out in the appended claims.

Figure 2:
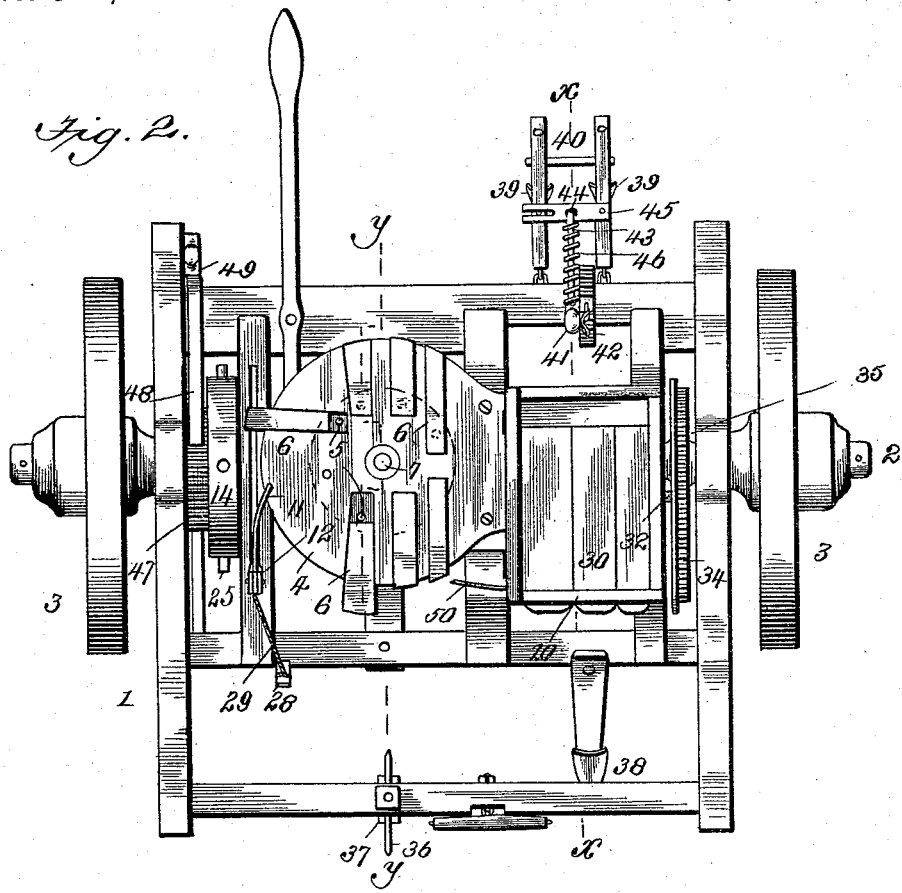
Figure 3:
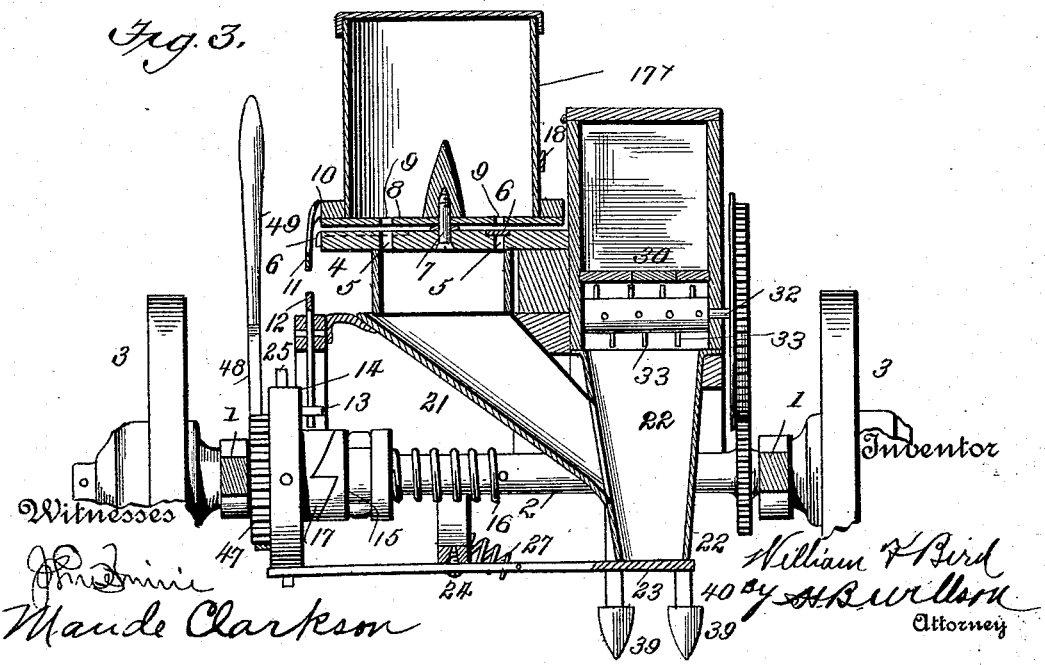
Figure 4:
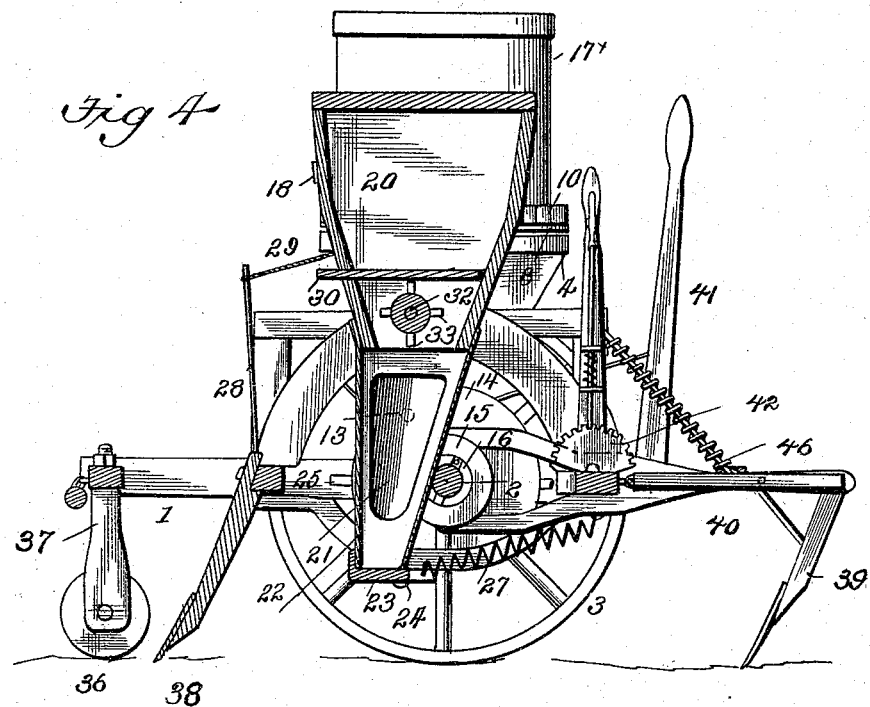
Figure 5:
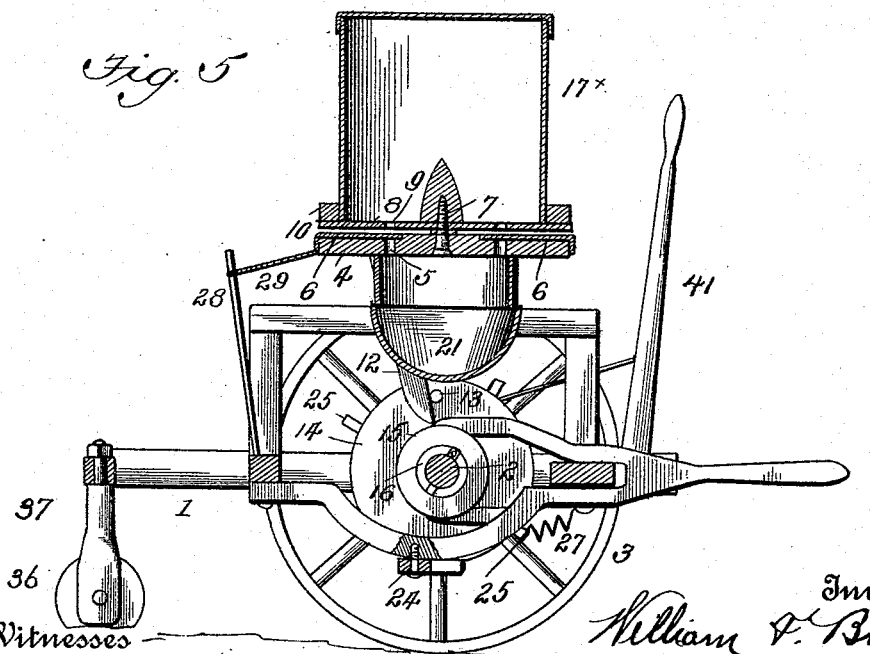

In the accompanying drawings, Figure 1 is a perspective view of my improved machine. Fig. 2 is a plan view with the seed-box and disk removed. Fig. 3 is a vertical transverse sectional view thereof. Fig. 4 is a vertical longitudinal sectional view on the line $x\,x$ of Fig. 2. Fig. 5 is a view similar to Fig. 4 on the line $y\,y$, Fig. 2.

1 indicates a suitably-constructed supporting or main frame of the device, supported upon an axle 2, carrying supporting-wheels 3. Suitably supported upon the frame 1 is a bottom 4, provided with a number of openings 5, over which are adapted to be arranged slides 6, whereby to vary the number of grains dropped. Secured upon a vertical shaft 7 carried by the bottom is a disk 8, which is provided with openings 9, adapted to register with the openings 5 in the bottom 4 when said disk is rotated. Secured to the disk 8 is a ratchet-wheel or a rim provided with ratchet-teeth, as seen at 10, and with which rim or wheel is adapted to engage a pawl-lever 11, carried by the upper end of a lever or arm 12, pivotally secured to the frame, and which lever 12 is adapted to engage at its lower end with pins 13, on the face of an operating-disk 14, loosely mounted on the shaft 2. The disk 14 is adapted to be rotated by the shaft or axle 2 by means of a clutch 15 splined upon the shaft and acted upon by a coiled or other spring 16, to cause the said clutch to engage with clutch-teeth 17, secured to the face of the disk 14. It will thus be seen that when the clutch devices are in engagement and the planter drawn over the ground the pins on disk 14 will oscillate the lever 12 and thus cause the pawl 11 to partially rotate the rim and consequently the disk 8 to bring the openings thereof over the openings in the bottom 4.

A seed-box $17^\times$ is mounted over the bottom 4 and is carried by a supporting-arm 18, secured to a fertilizer box or receptacle 20, suitably supported on the main frame. The grains dropped by the disk 8 descend along a chute 21, which at its lower end communicates with a discharge-chute 22, leading from the fertilizer-box, and the lower end of said chute 22 is adapted to be periodically opened and closed by a suitable valve 23, consisting of a lever pivoted at 24 to the main frame and its opposite end lying in the path of and adapted to be struck by pins 25 on the circumferential edge of the disk 14, so that the said pins act to periodically oscillate the lever to cause it to uncover the lower end of the chute 22 and thus permit the grains of corn and fertilizer to descend into the furrow.

By means of a coiled spring 27 secured at one end to the frame and to the lever the latter will be drawn back into its normal position to close the lower end of the chute 22 when the pin on disk 14 clears the said lever.

28 is a leaf-spring secured at its lower end to the frame and its upper end connected by a cord 29 or chain with the upper end of the lever 12 to retract it into its normal position after the lower end clears the pins on disk 14.

The fertilizer-box is adapted to have slides 30 inserted across the interior thereof toward its lower end, said slides being of varying widths, so as to vary the size of the opening through which the fertilizer can pass, and thus vary the quantity of fertilizer dropped into the chute 22. The said slides are adapted to be slid horizontally through openings in the side of the box. A shaft 32 extends horizontally across the box near its lower end and beneath the slides therein, said shaft having a series of projecting pins or studs 33, which serve, when the shaft is turned, to break up the fertilizer into small or fine pieces and keep the same from caking or in any way tending to obstruct the chute. The shaft is adapted to be revolved by means of a gear-wheel 34 meshing with a gear-wheel 35 mounted on shaft 2. The forward part of the frame is supported upon a supporting-wheel 36, carried by a hanger 37 secured to the frame.

38 indicates a suitable shovel secured to a standard and adapted to form a furrow to receive the corn and fertilizer dropped through the chute 22.

39 indicates shovels secured to standards carried by adjustable beams or arms 40 pivotally connected with the frame. The beams may be raised and lowered by means of a lever 41 pivoted to the frame, and having a dog adapted to engage with a quadrant-rack 42 carried by the frame. The lever is jointed to a rod 43, whose opposite end passes through a slot 44 in a cross bar or piece 45 secured to the beams 40. A coiled spring 46 encircles the rod 43, and thus serves to yieldingly hold the shovels to the ground and permit them to pass over firm obstructions which might otherwise injure them. The shovels are set so as to cover the furrow after the seed and fertilizer have been deposited therein.

To prevent backward rotation of the disk 14, I employ a ratchet-wheel 47, mounted on the shaft 2 and engaged by a pawl 48, carried by a lever 49 pivotally connected to the frame.

A suitable pawl 50, secured at one end to the fertilizer-box and engaging the ratchet-rim at the opposite end, prevents backward rotation of the said rim and consequently the seed-disk.

By varying the number of pins on the disk 14 corn will be dropped at greater or less intervals, as desired, and by varying the seed-slides and fertilizer-slides a greater or less quantity of seed and fertilizer will be dropped in each hill.

Having thus described my invention, what I claim, and desire to secure by Letters Patent, is—

1. In a corn planter, the combination with a supporting frame and shaft, of a clutch section adapted to be shifted on the shaft, a disk loose on the shaft and having clutch teeth adapted to be engaged by said clutch section, pins on the face of the disk upon which the clutch teeth are formed, a second series of pins on the circumferential edge of said disk, a pivoted horizontal lever having one end lying in the path of the first-mentioned pins, a revoluble disk having openings, a bottom having openings, slides adapted to be inserted between the said disk and bottom and to cover the openings in the bottom, a seed-box covering said disk and bottom, the slides being of varying widths and having a length to adapt them to project beyond the edge of the seed-box, a ratchet rim for the disk, a pivoted lever arranged in a vertical plane, a pawl carried by the upper end of said lever and engaging the ratchet rim, the lower end of the vertical lever lying in the path of the circumferentially arranged pins, a discharge chute adapted to receive the seed dropped from the seed-box, and over the lower end of which chute lies the inner end of the horizontal lever.

2. In a corn planter, the combination with a supporting frame and dropping mechanism, and a shovel carried by the frame and adapted to form a furrow, of a quadrant rack 42 carried by the frame, a lever 41 pivoted to the frame and having a pawl adapted to engage with said rack, rearwardly extending arms 40 pivoted to the frame at their forward ends, a rod 43 jointed to the lever and passing through a slot 44 in a cross piece 45, the latter being secured to the arms 40, a coiled spring encircling rod 43, shovel-standards carried by the outer ends of the arms 40, and shovels carried by the said standards.

3. In a corn planter, the combination with a supporting frame, of the seed-box, the disk having openings and the bottom, the latter also having openings, and means for operating said disk, the inclined chute 21, a fertilizer box open at bottom, a chute 22 leading from said fertilizer box and into which latter the chute 21 leads, and a lever having one end lying across the open lower end of the chute 22, and adapted to be periodically operated to uncover said lower end, a horizontal roller journaled in the fertilizer box and pins circumferentially arranged on said roller and gearing between said roller and the shaft of the machine and horizontal slides adapted to be inserted within the fertilizer box above the said roller, said slides being of various widths, as and for the purpose specified.

In testimony whereof I affix my signature in presence of two witnesses.

WILLIAM FRANKLIN BIRD.

Witnesses:
WM. H. H. HARNER,
C. P. MCGIBBONS.